United States Patent
Anding

[15] 3,696,869
[45] Oct. 10, 1972

[54] HOOF MAINTENANCE STAND

[72] Inventor: Fred H. Anding, P.O. Box 921, West Monroe, La. 71291

[22] Filed: Dec. 9, 1970

[21] Appl. No.: 96,533

[52] U.S. Cl. ................................................. 168/44
[51] Int. Cl. ........................................... A01l 07/00
[58] Field of Search ........................ 168/44; 269/328

[56] References Cited

UNITED STATES PATENTS

| 443,346 | 12/1890 | Allen | 168/44 |
| 286,389 | 10/1883 | Coffey | 168/44 |
| 339,375 | 4/1886 | Cherrier | 168/44 |

Primary Examiner—Hugh R. Chamblee
Attorney—Clarence A. O'Brien and Harvey B. Jacobson

[57] ABSTRACT

A folding leg-elevating, supporting and hoof maintaining device for use by a farrier, a blacksmith or an experienced person skilled in trimming, shoeing and hoof maintenance work. The device is characterized by a simple, practical and convenient-to-use stand, that is, a stand which when set up for use serves to suspend the ankle and hoof of the animal's leg. Using this stand the user does not have to lift and hold the animal'foot in position when trimming or shoeing. Nor does he have to rely on one hand and his own body as a support. Instead he has both hands free with the weight of the animal's leg elevated and supported whereby he is enabled to perform the work on the hoof with greatest speed, accuracy and precision. It will be noted that the construction and arrangement of component parts is such that they can be collapsed and folded into compact form for carrying, handling and storage.

8 Claims, 4 Drawing Figures

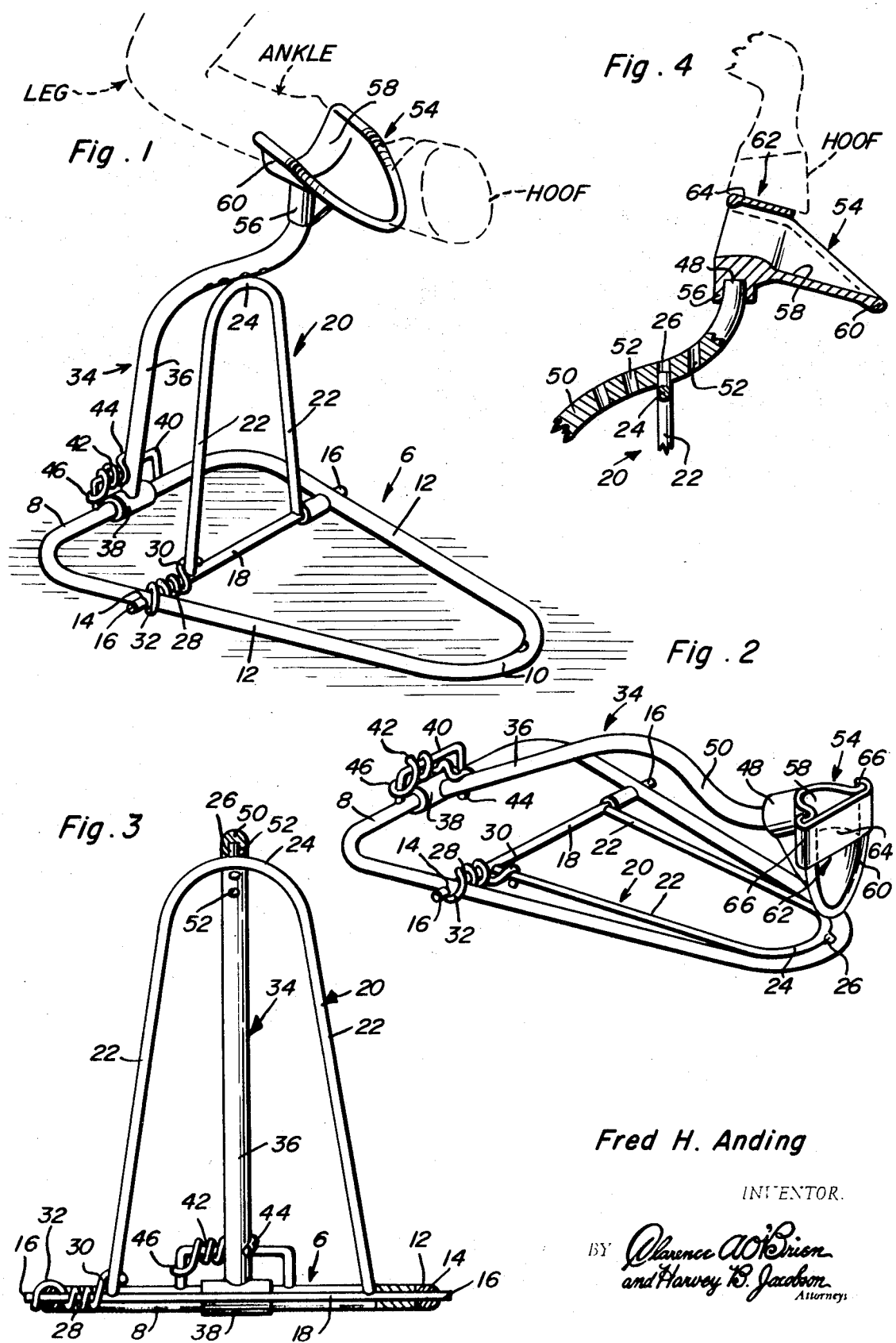

HOOF MAINTENANCE STAND

This invention relates to a unique folding or collapsible stand which lends itself to practical and time-saving use by a farrier, a blacksmith, or one who trims, shoes and maintains hoofed animals and pertains to an innovation which has been found to provide a solution to the problem of the user who because of back trouble or other physical difficulties has found it painfully laborious and time-consuming in attending to animal hoof maintenance work.

Hoof maintenance needs pose a real problem for the farrier or blacksmith who invariably encounters laborious difficulties in carrying out shoeing and trimming requirements. Persons conversant with this field of endeavor discover that for one physical difficulty or another, they are unable to hold the animal's hoof in position and at the same time trim or shoe the animal. For example holding the animal's leg with one hand and using the body as a support, only the other hand is free to perform the task in hand. Also it is a well known fact that the body of the worker is frequently at such an angle that it is not feasibly possible for him to look down at a correct angle upon the work area of the hoof. There has long existed a need for leg supporting and elevating means of a mechanical character which provides the elevating and suspension needs and which, as an added advantage, leaves both hands free to perform the work on the hoof with greater speed, accuracy and precision.

Time and again and as a result of improper trimming, a hoof will turn in and the animal may, and often does, become lame for life. This difficulty is caused primarily not so much through inexperience on the part of the blacksmith but because of his inability to view the hoof at a correct angle while holding the animal's leg in a steady and controllable position. Keeping these aspects of the over-all problem in mind it is an object of the present invention to provide a stand whose component parts are such that they provide the folding and collapsible features desired and achieve the end results desired with acceptable efficiency.

Then, too, experience has shown that the herein disclosed stand will enable individual riders of horses, not necessarily experienced blacksmiths, to properly dislodge and clean debris from a horse's hoof prior to use of the horse. As a matter of fact such procedures are recommended and should be followed according to acceptable rules of horsemanship prior to mounting a horse. With the disclosed stand properly set up for use the average experienced rider will be able to take care of the ordinary hoof difficulties.

Another aspect of the concept has to do with the fact that the stand herein revealed offers a satisfactory end product in the event that the animal begins to act up or get out of control. This is to say the stand is engineered in such a way that if the animal moves the lifted or elevated hoof or kicks the stand, the normally steady but yieldable component parts can become temporarily disconnected and can fold down to compact form in such a manner that injury to either the user of the stand or the animal is reduced to an acceptable minimum.

Because the principal component parts are made from bendable rod stock, the over-all stand is neither bulky nor too heavy or difficult to handle. The parts coact to provide stabilized balance when the stand is in use. The stand collapses instead of maintaining an upstanding or erect state if the animal acts up or pulls the leg from the ankle and hoof suspending bracket. The parts are of such simplicity that they can be replaced economically. There are no sharp edges to cut or injure the animal or the user. In fact the disclosed stand takes the place of having to laboriously support and steady the leg and consequently relieves the user of back strain and other painful and tedious difficulties.

Briefly the stand is characterized by a frame which is horizontally disposable when in use and which functions as a satisfactory self-standing base, that is, a base which is capable of placement for feasible use on a stationary foundation. A saddle-like ankle cradling, retaining and hoof-positioning bracket is provided and functions to properly elevate and steady the ankle and hoof. Leg elevating and supporting means is perched atop the supporting arm for uninhibited and clearly visual use. The supporting means has a lower end operatively joined to a predetermined part of the base and is adapted to locate the bracket in a balanced locale relative to and in a plane above and coordinating with the base.

More specifically the stand features a rigid substantially triangulate rod which constitutes the desired base frame. This frame serves to accommodate a vertically elongated rod which constitutes a supporting arm and has a lower end portion terminating in a sleeve. This sleeve provides a bearing and is spring-loaded and journaled and hinged for angular rotation on one end member of the frame. An ankle cradling, retaining and hoof-positioning bracket is perched and fixed on the upper end of the supporting arm. Biasing spring means is cooperatively associated with said lower end and said one end member of the frame and is capable of pivoting the arm from an upstanding in-use position to a downfolded out-of-use position atop the frame.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIG. 1 is a view in perspective of a horse hoof maintenance stand constructed in accordance with the principles of the invention and showing how the parts are constructed and in fact how they cooperate when being used as an elevating, supporting and retaining device for the ankle and hoof of the animal's leg.

FIG. 2 is a view also in perspective and based on FIG. 1 and which shows the spring-biased and spring-loaded component parts in their down-folded compact position and relationship.

FIG. 3 is an enlarged view showing certain of the details and particularly the manner in which the upper end of the prop serves to brace and support the bracket carrying arm.

And FIG. 4 is a detail view with parts in section and elevation showing the bracket and that portion of the arm which is cooperable therewith and the adjustable connection between the brace or prop and the arm.

With reference now to the views of the drawing singly and collectively the base is preferably in the form of a sturdy but durable and lightweight triangulate or an equivalent self-standing base. This part is also referred to as a base frame and is denoted, generally stated, by the numeral 6. One transverse end at the left is denoted at 8 and the rounded apical end portion is denoted at 10. The converging side members are denoted at 12 and are of duplicate construction and each member is provided spaced from the member 8 with a hole which serves as a bearing. These bearings are denoted at 14 and are in alignment and serve to accommodate the journaled terminal end portions 16 of a rocker shaft 18. It bridges the space between the side members 12 and serves to accommodate the aforementioned folding brace, more particularly an inverted U-shaped prop 20. The limbs 22 of the prop are joined with spaced end portions of the rocker shaft. The curvate bight portion 24 is provided with an outstanding projecting prong 26 which constitutes a keeper or detent. A coil spring 28 is provided at the left in FIG. 1 and surrounds an end portion of the rocker shaft and has one end hooked and anchored as at 30 on the adjacent limb 22. The other end is curved and hooked beneath the side member 12 as denoted at 32. This spring is tensioned so that it serves to normally spring the prop 20 from the upstanding usable position shown in FIGS. 1, 3 and 4 to the folded out-of-way position illustrated in FIG. 2.

This prop when in its elevated position serves to support the aforementioned support means. More specifically this means 34 comprises a rod which in turn is referred to as a vertically disposable arm. This rod or arm is of requisite height to achieve the result shown in FIGS. 1 and 3 in particular. The lower comparatively straight end portion 36 terminates in a sleeve 38 which is mounted for angular rotation on the aforementioned frame member 8. A substantially U-shaped anchor 40 is provided here as shown at the left in FIG. 1 and is joined with the member 8 and serves to permit a portion 42 of a properly coiled spring to be wound thereon. One hooked end 44 of the spring is anchored on the adjacent portion of the arm 36. The other hook or terminal end portion 46 is anchored on the anchor 40. This arrangement of parts serves to not only hingedly mount the arm 44, it serves to swing the arm from the up position shown in FIG. 1 to the down position shown in FIG. 2 where it is collapsed for handling and storage. An upper terminal end portion 48 of this arm is also substantially straight and the intervening portion of the arm is suitably curved as at 50 so that it overhangs the proper area of the base frame 6. It should be noted that this portion 50, that is the part illustrated in FIG. 4 is provided with longitudinally spaced open-ended holes which provide keeper holes 52 and which serve to accommodatingly receive the insertable and removable detent or prong 26. Consequently the connection between the spring-biased prop and the spring-loaded arm is such that it is adjustable and separable. In fact, the keeper 26 is capable of being "kicked" out of the keeper hole in which it is located in case the animal acts up and tends to be uncontrollable or unruly.

The means for accommodating and supporting the ankle of the leg of the horse comprises a part which is broadly referred to as a cradling, elevating and supporting bracket 54. This bracket is provided with a socket member 56 on its underneath convex side which is fixed to the terminal end 48 of the arm as shown in FIG. 4. The bracket itself provides an open-ended appropriately recessed trough or receiver which functions to seat the ankle. This open-ended trough portion is denoted, generally stated, by the numeral 56 and may vary in shape and size and can if desired be padded (not shown). The upstanding marginal walls may be provided with reinforcing beads as at 60.

It will be evident that with the construction shown the storage problem will be simplified. The spring-loaded hingedly mounted support member or arm 34 and spring-loaded prop 20 well serve the purposes for which they have been devised and coordinated. Weight on the support arm is distributed equally on the base by the prop or brace 22. Then too the device when in use takes the strain off the user's back and legs and other parts of his body. The device provides natural yielding properties, is inexpensive to own and maintain, is strong and durable and minimizes the likelihood of accident to both the user and the animal.

In use the device is placed beside the foot of the animal to be worked on in the upright position shown in FIG. 1 and a suitable adjustment is made by angling the arm 34 or the prop 20 as the case may be. When the device is not in use, or in case of accident, the parts spring down to the compact and convenient association and arrangement illustrated in FIG. 2.

Attention is now directed to an optionally usable feature; namely, a readily attachable and detachable accessory which is herein categorized as a convenient hoof rest. This rest 62 comprises a simple plastic or fiber glass plate 64 which is flat-faced rectangular in plan and has hooked ends 66 which can be slipped over and held in place atop the left hand end portion (FIGS. 2 and 4) of the beads or lip portions 60. The attachment provides a feasible rest atop which the hoof can be placed as shown in phantom lines in FIG. 4 while the farrier uses a hand file (not shown) for trimming needs.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use by a farrier, a blacksmith, or one who shoes and maintains hoofed animals, a hoof maintenance stand comprising: a horizontal self-standing base capable of placement for feasible use on a stationary foundation, a saddle-like ankle cradling, retaining, and hoof-positioning bracket, and bracket elevating, ankle steadying and supporting means atop which said bracket is perched and fixed for uninhibited clearly visual use, said supporting means having a lower end operatively joined to a predetermined part of said base and adapted to locate the bracket in balanced locale relative to and in a plane above said base, a stabilizing brace having a lower end fastened on said base and upper end operatively connected with an upper portion of said supporting means, said supporting means comprising a vertically elongated arm whose lower end is hingedly joined to the coacting part of said base and whose upper bracket-equipped end is foldable downwardly and capable of being collapsed atop said base for compact and convenient handling and storing needs, said brace comprising a collapsible prop having a lower end hingedly mounted on a median part of said base and an upper end which is detachably, adjustably and retentively connectible to a coating part of said arm.

2. The stand defined in and according to claim 1 and wherein said arm has a substantially straight vertically disposable lower portion, a generally straight vertically disposed upper end portion and a longitudinally curved median and upper portion, whereby said bracket, when in use, occupies an offset portion which overhangs a median area of said base.

3. A portable and folding leg elevating, supporting and hoof maintaining stand designed and adapted for use by a farrier, blacksmith or person skilled in trimming, shoeing and hoof maintenance work comprising: a rigid substantially triangulate rod constituting base frame, a vertically elongated rod constituting a supporting arm and having a lower end portion terminating in a sleeve, said sleeve providing a bearing and being journalled and hinged for angular rotation on one end member of said frame, an ankle cradling, retaining and hoof-positioning bracket perched and fixed on an upper end of said supporting arm, a biasing spring cooperatively associated with said lower end and said one end member of said frame and capable of pivoting said arm from an upstanding in-use position to a down-folded out-of-use position atop said frame, the opposed side members of said frame having bearings, a rocker shaft coplanar with and bridging an oriented portion of said frame and having terminal end portions journalled for angular rotation in their respectively cooperable bearings, a folding prop providing a stabilizing prop and having a lower end fixed to said rocker shaft and an upper end which is operatively connectible to an upper end portion of said arm.

4. The stand defined in and according to claim 3, and wherein said arm has a substantially straight vertically disposable lower portion, a generally straight vertically disposable upper free end portion carrying said bracket and a longitudinally curved median and upper end portion overhanging a median areal portion of said frame and serving to locate said bracket in a place of vantage when in use, said prop being substantially U-shaped in form with its limbs joined to said rocker shaft and its bight portion provided with a projecting keeper prong, said arm having spaced keeper holes for selective adjustable reception of said prong.

5. The stand defined in and according to claim 4, and a coil spring of a size and tension to yieldingly force said prop to a folded position atop said frame, said spring surrounding and being mounted on one end of said rocker shaft and having one end anchored on an adjacent part of said frame and its other end anchored on an adjacent limb of said prop.

6. A hoof maintenance stand comprising an elongated base, an elongated upstanding support arm having its lower end pivotally secured to one end portion of said base for swinging of the other upper free end of said arm downward toward the remote end of said base with the arm disposed in a collapsed position overlying said base, an elongated upstanding prop of shorter length than said support arm, the lower end of said prop being pivotally supported from a portion of said base intermediate its opposite ends for swinging of the upper free end of said prop downward toward a predetermined end of said frame and a folded position generally paralleling said frame, the upper end of said prop and a portion of said support arm spaced therealong from its free end including coacting means releasably supporting the upper end portion of said support arm from the upper end portion of said prop, the upper end of said support arm including means for removably supporting the free end of the leg of a hooved animal therefrom.

7. The combination of claim 6 wherein said prop is swingable downwardly toward said remote end of said base.

8. The combination of claim 7 wherein said elongated base comprises an open frame including opposite ends and opposite sides, the lower end of said upstanding support arm being pivotally supported from one of said frame ends, the lower end of said prop being pivotally supported from corresponding portions of said frame sides intermediate the opposite ends thereof.

* * * * *